UNITED STATES PATENT OFFICE.

CHARLES A. PSILANDER AND THOMAS S. SCOTT, OF PITTSBURG, PENNSYLVANIA, ASSIGNORS TO WESTINGHOUSE ELECTRIC & MANUFACTURING COMPANY, A CORPORATION OF PENNSYLVANIA.

DYNAMO-ELECTRIC MACHINE.

956,543. Specification of Letters Patent. Patented May 3, 1910.

Application filed February 6, 1906. Serial No. 299,760.

*To all whom it may concern:*

Be it known that we, CHARLES A. PSILANDER and THOMAS S. SCOTT, citizens of the United States, and residents of Pittsburg, in the county of Allegheny and State of Pennsylvania, have invented a new and useful Improvement in Dynamo-Electric Machines, of which the following is a specification.

Our invention relates to dynamo-electric machines and particularly to those of the commutator type of construction.

The object of our invention is to provide a novel and improved means for mounting the brush holders of such machines.

The laminated core structures of dynamo-electric machines are frequently provided with dove-tail projections that are adapted to occupy corresponding grooves or recesses in supporting frames therefor or with dove-tail recesses that register with the recesses in the supporting frame and in which double, inverted dove-tail keys are located, the core and frame being in this manner rigidly secured together.

In dynamo-electric machines, such as motors that propel railway vehicles, in which the brush holders are generally so mounted as to be incapable of circumferential adjustment, we propose to provide frame grooves or recesses in substantial alinement with the grooves which are utilized for supporting the core laminæ, in order to form seats for the brush holders. Such a structure permits of so locating hand-holes in proximity to the brush holders that they shall be symmetrically arranged with reference to the ventilating openings which are usually provided in the supporting frame adjacent to the core structure.

Figure 1 of the accompanying drawings is a view in section of a portion of a dynamo-electric machine constructed in accordance with our invention, and Fig. 2 is a view in elevation of the inside of the structure shown in Fig. 1, certain of the parts being broken away and removed for the sake of clearness of illustration.

A laminated core structure 1 having inwardly extending polar projections 2 is provided, on its outer circumference, with a set of dove-tail-shaped ribs 3 that are located in corresponding grooves or recesses 4 in the faces of longitudinal pads or bosses of a supporting and inclosing structure or frame 5. Main magnetizing coils 6 for the core structure surround the polar projections 2 and conductors 7 of an auxiliary winding are located in slots 8 in proximity to the faces of the polar projections, the conductors in each polar projection being connected with the conductors in adjacent polar projections, by means of conductors 9 that extend around the inter-polar spaces, so as to permit of removal of the coils 6 without necessitating disturbance of other parts.

The supporting structure 5 is also provided with a set of grooves or recesses 10 of any desired shape in cross section that are in substantial alinement with the dove-tail recesses in which the projections 3 are located. Brackets 11, that are seated in the grooves 10 and are secured therein by means of bolts 12, constitute supports for and are insulated from suitable holders 13 for brushes 14 that engage a commutator cylinder 15, the exact and proper positions of the brushes being predetermined and the dimensions of the bracket 11 and of the holder 13 being adjusted accordingly. When the grooves are arranged in the supporting structure in this manner, hand-holes 16 may be provided in and arranged symmetrically with reference to ventilating openings 17 that are provided, as is usual, adjacent to the core structure, and the machining of the interior of the supporting frame is also greatly facilitated.

While we have shown the core structure as provided with dove-tail shaped ribs, it will, of course, be understood that dove-tail or other shaped recesses may be provided in the outer circumference thereof and that double, inverted dove-tail keys or I-shaped keys may be employed for securing the core structure to the supporting frame.

Many other modifications of the structure may be made, within considerable limits, without departing from the spirit of the invention.

We claim as our invention:

1. In a dynamo-electric machine, the combination with a set of brush holders and a core structure having dove-tail-shaped projections, of a supporting frame for the core structure having recesses for the projections and recesses in substantial alinement therewith in which the brush holders are seated and secured.

2. In a dynamo-electric machine, the combination with a set of brush holders and a core structure, of a supporting frame for the core structure having recesses to coöperate with the core structure and alined recesses in which the brush holders are seated and secured.

3. In a dynamo-electric machine, the combination with a set of brush holders and a core structure, of a supporting frame for the core structure having two sets of recesses that are respectively in substantial alinement, in one set of which the brush holders are seated and secured, and means coöperating with the other set to secure the core structure to the supporting frame.

4. In a dynamo-electric machine, the combination with a set of brush holders and a core structure, of a supporting frame for the core structure having two sets of alined recesses, in one set of which the brush holders are seated and secured, and means coöperating with the other set to secure the core structure to the supporting frame.

5. In a dynamo-electric machine, the combination with a frame or shell having symmetrically disposed openings and recesses or grooves alternating circumferentially therewith, of a laminated core and brush holders having projections that fit into said recesses or grooves.

6. In a dynamo-electric machine, the combination with a frame or shell having uniformly spaced openings and internal grooves or recesses alternating circumferentially therewith, of a laminated core having projections seated in some of said grooves or recesses and brush holders having projections seated in the remaining grooves or recesses.

7. In an electric motor, the combination with a frame or shell having symmetrically disposed openings and internal grooves or recesses alternating circumferentially therewith, of a laminated core having anchoring means to engage some of said grooves or recesses and brush holders having projections to engage the remaining grooves or recesses.

In testimony whereof, we have hereunto subscribed our names this 25th day of January, 1906.

CHARLES A. PSILANDER.
THOS. S. SCOTT.

Witnesses:
    BIRNEY HINES,
    LOUIS W. MILLIS.

sitive photographic surface comprising a vehicle, a halogen silver salt, and an ammonia derivative of the kind set forth.

6. As a new article of manufacture, a sensitive photographic surface comprising a vehicle, a halogen salt, and a compound of hydrazin.

7. As a new article of manufacture, a sensitive photographic surface comprising a vehicle, a halogen salt, and a salt of hydrazin.

8. As a new article of manufacture a photographic surface comprising a vehicle, a halogen silver salt, and a salt of hydrazin.

9. As a new article of manufacture, a photographic surface comprising a vehicle, a photographic sensitive compound and a compound of hydrazin.

10. As a new article of manufacture, a photographic surface comprising a vehicle, a silver salt, and a compound of hydrazin.

11. As a new article of manufacture, a photographic surface comprising a vehicle, a halogen silver salt, and a compound of hydrazin.

12. As a new article of manufacture, a sensitive photographic surface comprising a colloid vehicle of ether-alcohol-collodion, a silver salt, and an ammonia derivative soluble in ether-alcohol.

13. As a new article of manufacture, a sensitive photographic surface comprising a colloid vehicle of ether-alcohol-collodion, a silver salt, and a hydrazid.

14. As a new article of manufacture, a sensitive photographic surface comprising a colloid vehicle of ether-alcohol-collodion, a haloid silver salt, and formyl hydrazin.

Signed at Edinburgh this twenty eighth day of March 1908.

WILLIAM HAY CALDWELL.

Witnesses:
 E. INGLIS LINDSAY,
 W. SUTHERLAND.